(12) United States Patent
Oefner

(10) Patent No.: US 9,114,588 B2
(45) Date of Patent: Aug. 25, 2015

(54) SKIN-STIFFENER TRANSITION ASSEMBLY, METHOD OF MANUFACTURE AND APPLICATION OF SAID SKIN-STIFFENER TRANSITION ASSEMBLY

(71) Applicant: AIRBUS HELICOPTERS DEUTSCHLAND GMBH, Donauworth (DE)

(72) Inventor: Walter Oefner, Otterfing (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 130 days.

(21) Appl. No.: 13/890,461

(22) Filed: May 9, 2013

(65) Prior Publication Data

US 2013/0316131 A1    Nov. 28, 2013

(30) Foreign Application Priority Data

May 22, 2012  (EP) .................................... 12400016

(51) Int. Cl.
*B32B 5/12*    (2006.01)
*B32B 1/04*    (2006.01)
(Continued)

(52) U.S. Cl.
CPC ................. *B32B 1/04* (2013.01); *B29C 69/001* (2013.01); *B29D 99/0014* (2013.01); *B64C 1/064* (2013.01); *B29L 2031/3076* (2013.01); *B29L 2031/3088* (2013.01); *B64C 2001/0072* (2013.01); *Y02T 50/433* (2013.01); *Y10T 428/2419* (2015.01)

(58) Field of Classification Search
CPC ........................................................ B32B 5/12
USPC ........................... 428/119, 121, 130; 244/131
See application file for complete search history.

(56) References Cited

U.S. PATENT DOCUMENTS 3,185,605 A    5/1965  Osborne
4,909,685 A    3/1990  Hirst
(Continued)

FOREIGN PATENT DOCUMENTS

EP    0339223 A2    11/1989

OTHER PUBLICATIONS

Search Report and Written Opinion; Application No. EP 12400016; dated Nov. 13, 2012.

*Primary Examiner* — Alexander Thomas
(74) *Attorney, Agent, or Firm* — Brooks Kushman P.C.

(57) ABSTRACT

A skin-stiffener transition assembly (1) with a skin (4) and two L-shaped fiber-reinforced fabric preforms (2, 3) for a flange and a composite gusset filler (5) integrated between said skin (4) and said two L-shaped fiber-reinforced fabric preforms (2, 3). The skin (4) comprises two separate skin layers (7, 8) and the flange comprises a flange layer (6), each of said skin layers (7, 8) and said flange layer (6) being provided with cut outs (9, 10) along one side. Said skin layers (7, 8) and the flange layer (6) are attached to the composite gusset filler (5) with at least one of its cut-outs (9, 10) to one side of the essentially polygonal cross section of the composite gusset filler (5) and with at least one of its adjacent cut-outs (9, 10) to another side of the essentially polygonal cross section of the composite gusset filler (5). The present invention relates as well to a method of manufacture of said skin-stiffener transition assembly (1) and to applications of said skin-stiffener transition assembly (1).

20 Claims, 2 Drawing Sheets

(51) Int. Cl.
*B29D 99/00* (2010.01)
*B64C 1/06* (2006.01)
*B29C 69/00* (2006.01)
*B29L 31/30* (2006.01)
*B64C 1/00* (2006.01)

(56) References Cited

U.S. PATENT DOCUMENTS

| | | |
|---|---|---|
| 5,041,324 A | 8/1991 | Siegling |
| 6,562,436 B2 | 5/2003 | George |
| 2009/0317587 A1 | 12/2009 | Deobald |

SKIN-STIFFENER TRANSITION ASSEMBLY, METHOD OF MANUFACTURE AND APPLICATION OF SAID SKIN-STIFFENER TRANSITION ASSEMBLY

CROSS-REFERENCE TO RELATED APPLICATIONS

This application claims priority to European patent application No. 12 400016.7 filed May 22, 2012, the disclosure of which is incorporated in its entirety by reference herein.

BACKGROUND OF THE INVENTION (1) Field of the Invention

The present invention relates to a skin-stiffener transition assembly and to a method of manufacture of said skin-stiffener transition assembly. The present invention relates as well to applications of said skin-stiffener transition assembly.

(2) Description of Related Art

Fiber composite spars or skin-stiffener transitions are made by binding two "C" channels together to form a web with flanges. The channels may comprise a plurality of plies of fiber fabrics either in dry state or pre-impregnated with resin. When the channels are joined at the webs, an interstice or so-called interstice occurs along the flange because of these radii. Typically a gusset filler fills the interstice.

The skin-stiffener transitions are sensitive towards loads pulling off the flanges from the skin and/or sensitive towards impacts against the flanges.

The document U.S. Pat. No. 6,562,436 (A1) discloses a laminated composite (multi-ply) radius filler includes a plurality of woven fabric reinforced plies cut to fill a radius gap (including, if appropriate, intentional overfill) to increase absolute strength, to increase specific strength, or to reduce cost by reducing cracking and distortion in the radius of a composite assembly. The present invention also describes the method of manufacture and method of use for such laminated composite radius filler.

The document U.S. Ser. No. 2009/0317587 A1 discloses a composite stiffener fabricated using preforms of laminated, unidirectional composite tape. The stiffener includes a void that is reinforced by a filler wrapped with a structural adhesive. The surfaces of the preforms surrounding the void include a layer of composite fabric which is bonded to the filler by the adhesive, thereby increasing the toughness of stiffeners around the void and improving pull-off strength of the stiffener.

The document EP 0339 223 A1 discloses a fabric for making a constructional part, especially a hardened resin-saturated constructional part, the fabric consisting of an industrial yarn, such as particularly aramid fiber, carbon fiber, ceramic fiber or glass fiber, and proposes, in order to increase the proportion of reinforcing textile structure, that the fabric consists of two warp systems, of which the second serves for forming folds fastened to the first warp system at both ends, as seen in cross-section, the two warp systems being connected to one another at the fold ends by means of fixing wefts. The textile structure can advantageously be produced in one piece; there is no need for a multi-part construction making it more expensive.

The document U.S. Pat. No. 4,909,655 A discloses a joint for aircraft wing skins which have previously been connected to support substructures by rivets or other mechanical fasteners which create stress points and leakage points when aircraft wings are filled with fuel. Interleaved plies of a composite fabric are used to mechanically interlock the wing skin and support substructure. The structural integrity of the connection joint between wing skin and support substructure is increased.

The document U.S. Pat. No. 3,185,605 A discloses laminates of glass cloth, felted fibers, knitted cloth, parallel threads or paper, bonded with cold-setting or thermosetting resin made with selected areas left unbonded by interleaving the layers in those areas, or parts thereof adjacent to the areas to be bonded, with sheets, e.g. of polyvinyl chloride or polythene, incompatible with the resin and holding them under pressure during impregnation of the layers with, and curing of, the resin. The unbonded layers may later be interleaved or otherwise combined with the layers of other laminates to make shaped articles.

BRIEF SUMMARY OF THE INVENTION

It is an objective of the invention to provide a skin-stiffener transition with a composite gusset filler that better meets the challenges faced with structural loading. It is a further objective of the invention to provide a method of manufacture of said skin-stiffener transition with said composite gusset filler and applications for said skin-stiffener transition with a composite gusset filler.

The solution is provided with a skin-stiffener transition with a composite gusset filler and a method of manufacture of said skin-stiffener transition with a composite gusset filler. A further solution is provided with applications of said skin-stiffener transition composite with a gusset filler.

According to the invention a skin-stiffener transition assembly is provided with a skin, and two L-shaped fiber-reinforced fabric preforms for a flange and a composite gusset filler integrated between said skin and said two L-shaped fiber-reinforced fabric preforms. Said composite gusset filler is preformed to an essentially polygonal cross section. The skin comprises two separate skin layers and the flange comprises a flange layer. Each of said skin layers and said flange layer are provided with cut outs along one side and at least one of said cut outs is bent relative to at least one adjacent cut out. Said skin layers and the flange layer are attached to the composite gusset filler with at least one of their cut-outs to one side of the essentially polygonal cross section of the composite gusset filler and with at least one of their adjacent cut-outs to another side of the essentially polygonal cross section of the composite gusset filler. According to an advantage of the invention the suitable arrangement of alternating cut outs from different skin layers or said flange layer along the sides of the polygonal composite gusset filler prevents the propagation of cracks along any of the skin and/or the two L-shaped fiber-reinforced fabric preforms for the flange next to the edges of the embedded polygonal composite gusset filler.

According to a preferred embodiment of the invention the bent cut-outs are bent with an angle <90° relative to their respective plains of said skin layers, preferably with an angle <60° relative to their respective plains of said skin layers, or the bent cut-outs are bent with an angle <90° relative to their respective plain of said flange layer, preferably with an angle <30° relative to their respective plain of said flange layer.

According to a further preferred embodiment of the invention the essentially polygonal cross section of the composite gusset filler is triangular or trapezoidal.

According to a further preferred embodiment of the invention the composite gusset filler is cut with the trapezoidal cross section from a prepreg or pressed multilayered compound plate for an integration into the inventive skin-stiffener transition assembly without any further processing.

According to a further preferred embodiment of the invention the composite gusset filler is rolled from tapes or tissues and subsequently shaped to the essentially polygonal cross section.

According to a further preferred embodiment of the invention the depth of the cut outs are adapted to the dimensions of the cross section of the composite gusset filler such that the cut outs preferably reach from one edge to the next edge of the essentially polygonal cross section.

According to a further preferred embodiment of the invention the lengths of the cut outs at a side of at least one preform are adapted to the lengths of the cut outs at a side of at least one intersecting preform such that the cut outs of one layer can intersect smoothly with the cut outs of an adjacent layer to avoid any protrusions in the plains formed by the intersection of said skin layers or by the intersection of said skin layers with said flange layer.

According to a further preferred embodiment of the invention the cut outs are not rectangular to the side of at least one preform to allow a curved composite gusset filler.

According to a preferred embodiment of the invention a method of manufacture of said skin-stiffener transition assembly with an integrated composite gusset filler comprises the steps of providing a skin with skin layers and a flange with a flange layer, cutting along one side of each of said skin layers and said flange layer and bending open a part or all of the cut-outs along the one cut side of each of said skin layers and said flange layer. Further a semi-finished composite gusset filler is provided. Said cut outs are attached along the cut sides to the composite gusset filler with the bent open cut-outs to at least one side of the essentially polygonal cross section of the composite gusset filler and with the remaining cut-outs to another side of the essentially polygonal cross section of the composite gusset filler.

According to a further preferred embodiment of the invention the semi-finished composite gusset filler is cut by ultrasonic cutting from a pre-compacted or pressed preform.

According to a further preferred embodiment of the invention the semi-finished composite gusset filler is made by braiding and by subsequently pressing to a round, trapezoidal or triangular shape.

According to a further preferred embodiment of the invention said cut outs are glued along the cut sides to the composite gusset filler.

According to a preferred embodiment of the invention said skin-stiffener transitions with a composite gusset filler are applied to helicopter airframes, helicopter structural parts, airplane doors, airplane frame manufacturing and/or non-aerospace applications.

BRIEF DESCRIPTION OF THE SEVERAL VIEWS OF THE DRAWINGS

A preferred embodiment of the invention is described in the following description with reference to the attached drawings.

DETAILED DESCRIPTION OF THE INVENTION

Figure 1:
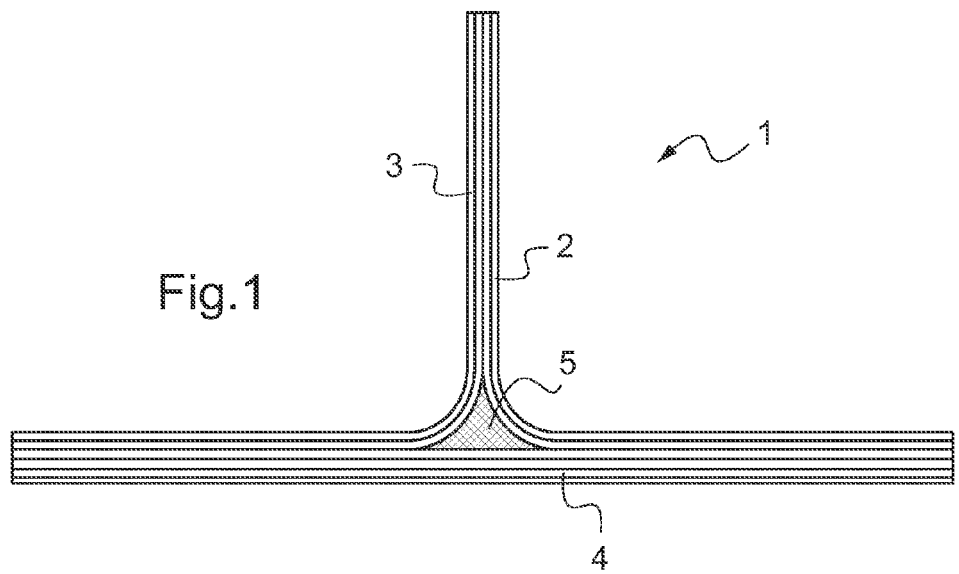
FIG. 1 is a sectional view of a skin-stiffener transition with an integrated composite gusset filler according to the invention.

As shown in FIG. 1 a skin-stiffener transition 1 comprises two essentially L-shaped preforms 2, 3 made from fiber-reinforced fabric plies. The two essentially L-shaped preforms 2, 3 are semi-finished and are attached to each other to provide a flange of an aircraft structure (not shown). The two L-shaped preforms 2, 3 adhere by gluing to a skin 4 of the skin-stiffener transition 1.

A semi-finished composite gusset filler 5 acts against debonding or delamination of the skin-stiffener transition 1. The semi-finished composite gusset filler 5 is used to create the preforms for resin-injected Carbon Fiber Reinforced Plastic (CFRP) applied for semi-finished skin-stiffener transitions 1 of helicopter airframes, helicopter structural parts, airplane doors, airplane fuselage and cabin structures and/or non-aerospace applications. The semi-finished composite gusset filler 5, the two L-shaped preforms 2, 3 and the skin 4 are made of the same material. The semi-finished composite gusset filler 5 may as well be made of milled foam.

Each of the two L-shaped fiber-reinforced fabric preforms 2, 3 and the skin 4 are conceived as a laminate ply stacking.

If a tensile load F is applied to the two L-shaped preformed fiber-reinforced fabric plies 2, 3 out-of plane stresses may lead to failure, such as debonding or delamination from the skin 4 of the skin-stiffener transition 5. The respective laminate ply stackings may collapse if an impact is applied to the radii at the two L-shaped preformed fiber-reinforced fabric plies 2, 3 leading to debonding or delamination of the skin-stiffener transition 5.

Figure 2:
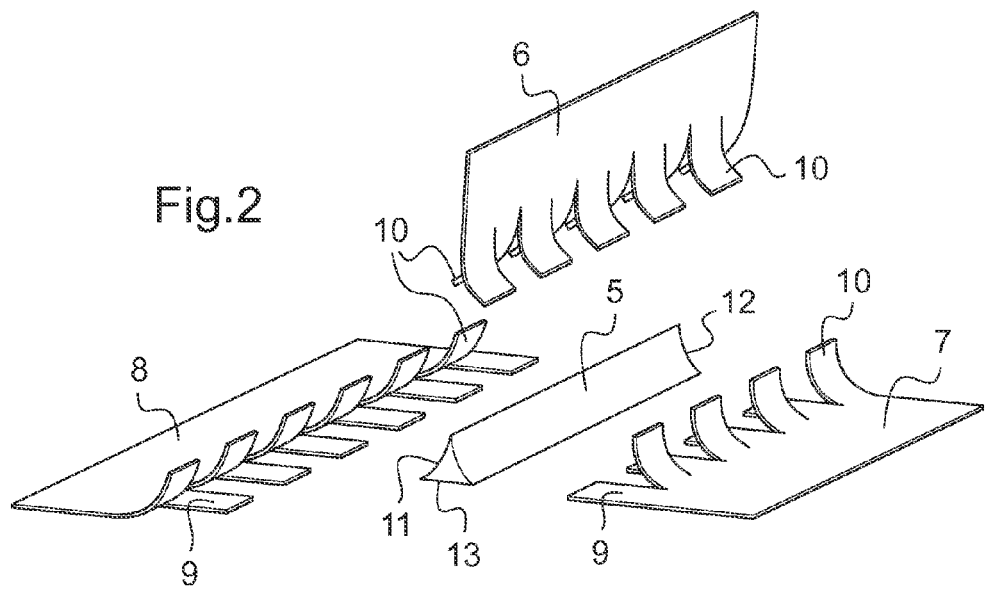
FIG. 2 is an exploded view of a skin-stiffener transition and a composite gusset filler according to the invention.

According to FIG. 2 corresponding features are referred to with the references of FIG. 1. The two essentially L-shaped preforms 2, 3 of the skin-stiffener transition 1 comprise an essentially plane, fiber-reinforced flange layer 6. The skin 4 of the skin-stiffener transition 1 comprises an essentially plane, right hand fiber-reinforced skin layer 7 and an essentially plane, left hand fiber-reinforced skin layer 8 made of one or more single layers, said layers being optionally hafted with differently oriented fibers, said orientations being preferably +45°, −45°, +90°.

Both skin layers 7, 8 and the flange layer 6 are provided with cuts regularly distributed along their respective sides oriented towards the semi-finished composite gusset filler 5. The cuts are essentially rectangular and with the same depth into the respective sides of both skin layers 7, 8 or the flange layer 6. The respective skin layers 7, 8 comprise at said sides essentially plane cut outs 9 followed by cut outs 10 bent out of the intrinsic plains of the respective skin layers 7, 8. At said side of the flange layer 6 all cut outs 10 are bent out of the intrinsic plain with one bent cut out 10 followed by a bent cut out 10 with an opposed curvature. Each cut out 9, 10 at one side is either bent itself or has next to it at least one bent cut out 10 at said same side of the respective skin layers 7, 8, thus providing alternating series of bent and non bent cut outs 9, 10 along said same side. The flange layer 6 provides alternating series of bent cut outs 10 with opposed curvatures along said one side. The bent cut outs 10 are arranged at the respective sides of the skin layers 7, 8 and the flange layer 6 like a zip, i.e. bent cut outs 10 of the skin layer 7 are opposite to non bent cut outs 9 of the skin layer 8 and the alternating bent cut outs 10 of the flange layer 6 are arranged to meet the alternating non bent cut outs 9 of both skin layers 7, 8. As the dimensions of the alternating bent cut outs 10 and the alternating non bent cut outs 9 are the same the alternating bent cut outs 10 fit smoothly in between the alternating non bent cut outs 9.

The semi-finished composite gusset filler 5 is an equilateral triangle with two concave sides 11, 12 and an essentially plane skin-base 13.

Figure 3:
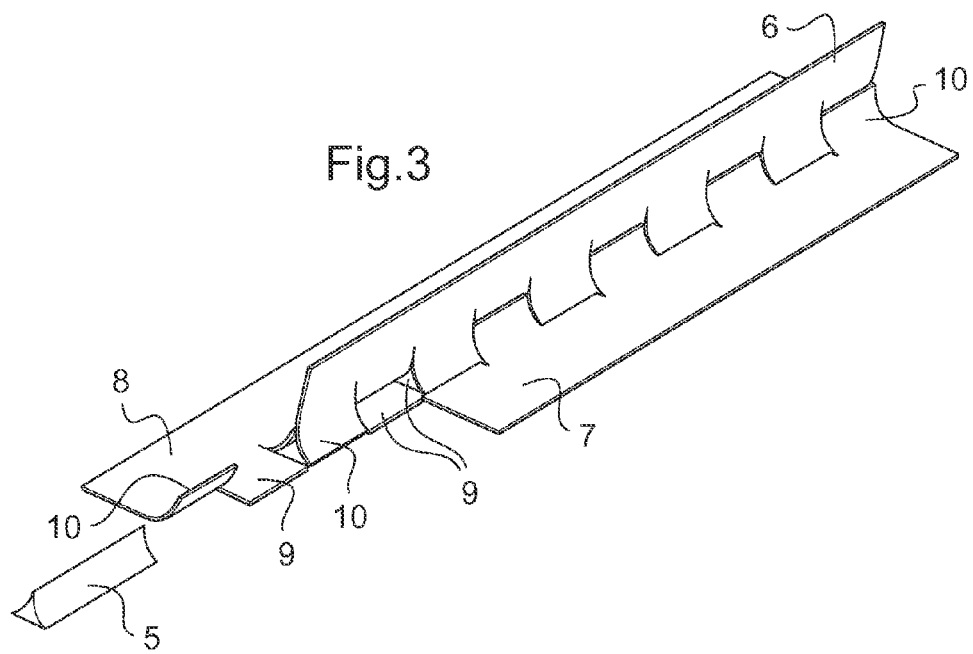
FIG. 3 is a three dimensional view of an assembly of skin-stiffener transition and a composite gusset filler according to FIG. 2.

According to FIG. 3 corresponding features are referred to with the references of FIG. 1, 2. The alternating bent cut outs 10 of the flange layer 6 are inserted in between the alternating bent cut outs 10 of both skin layers 7, 8. A part of the skin layer 7 is not shown. The alternating non bent cut outs 9 of both skin layers 7, 8 are inserted into each other forming a smooth plain. The semi-finished composite gusset filler 5 is fitted in between the flange layer 6 and both skin layers 7, 8 and the alternating bent cut outs 10 of both skin layers 7, 8 and the flange layer 6 are attached to the two concave sides 11, 12 of the gusset filler 5 while the alternating non bent cut outs 9 of both skin layers 7, 8 are attached to the skin-base 13 of the gusset filler 5.

Figure 4:
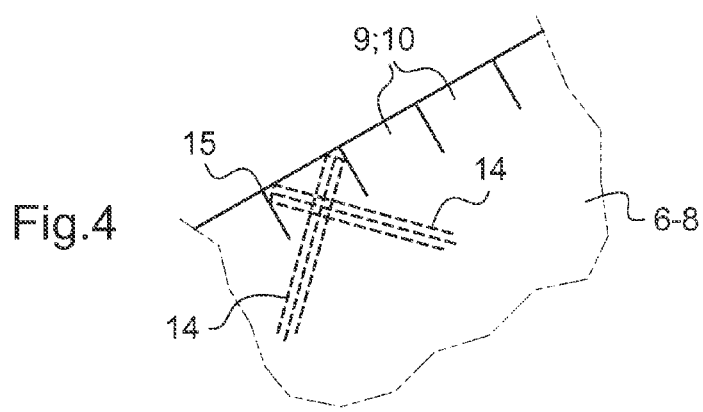
FIG. 4 is a top view of a detail of the skin-stiffener transition according to the invention.

According to FIG. 4 corresponding features are referred to with the references of FIGS. 1, 2 and 3. The essentially rectangular cuts with a length b between each other are having each a depth allowing the fibers 14 to go straight with an angle of 45° from a corner 15 at the respective side of the cut out 9, 10 into both skin layers 7, 8 or the flange layer 6.

Figure 5:
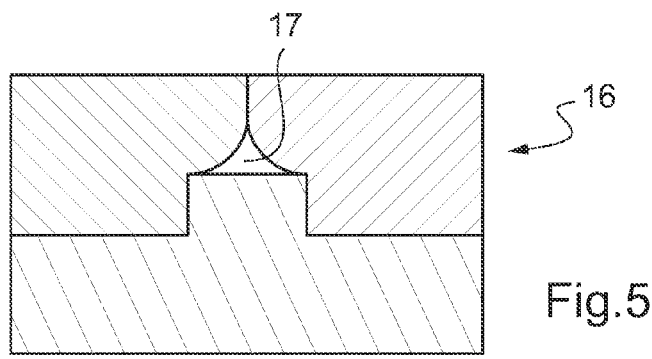
FIG. 5 is a cross sectional view of a device for providing a composite gusset filler according to FIG. 2.

According to FIG. 5 corresponding features are referred to with the references of FIG. 1-4. A tripartite press mold 16 provides a triangular cavity 17 for pre-compacting as prepreg or pre-shaping as dry fiber material with binder the semi-finished composite gusset filler 5 under heat to its final geometry.

Method to Manufacture said Skin-Stiffener Transition Assembly

Said skin-stiffener transition assembly 1 is made as prepreg or by resin transfer molding with a composite gusset filler 5 conditioned to its final shape. Said method to manufacture said skin-stiffener transition assembly 1 comprises providing a skin 4 comprising separated skin layers 7, 8 and two essentially L-shaped preforms 2, 3 comprising a flange layer 6 of said skin-stiffener transition 1. Cuts are made rectangular along one side into each of the skin layers 7, 8 and the flange layer 6 to provide cut outs 9, 10.

Further provided is a semi-finished composite gusset filler from prepreg or from a bindered material with a defined layered structure, cut by ultrasonic cutting from said pre-compacted or pressed preform or by braiding and by subsequently pressing under heat to a round or polygonal shape, preferably a trapezoidal or triangular shape.

Cut-outs 10 are bent out of the intrinsic planes of the skin layers 7, 8 as alternating series with the remaining non bent cut outs 9 along the respective one cut side of the skin layers 7, 8. The flange layer 6 is provided with bent cut-outs 10 out of its intrinsic plane as alternating series with opposed curvatures. The semi-finished, triangular composite gusset filler 5 is arranged in between the alternating series of cut-outs 9, 10 along the respective cut side of each of the skin layers 7, 8 and the flange layer 6.

The skin layers 7, 8 and the flange layer 6 are arranged in a way that the flange layer 6 is attached along its cut side to the composite gusset filler 5 with its one serial of bent cut-outs 10 to one side of the essentially triangular cross section of the composite gusset filler 5 and with its alternating serial of bent cut-outs 10 with opposed curvature to another side of the essentially triangular cross section of the composite gusset filler 5. The skin layers 7, 8 are arranged in a way that they are attached along their cut sides to the composite gusset filler 5 with their respective one serial of bent cut-outs 10 to the sides of the essentially polygonal cross section of the composite gusset filler 5 attached to the alternating series of bent cut-outs 10 with opposed curvatures from the flange layer 6, said bent cut-outs 10 of the skin layers 7, 8 intersecting respectively from opposed sides with the bent cut-outs 10 with opposed curvatures from the flange layer 6 along the two different sides of the essentially triangular cross section of the composite gusset filler 5. Attachment of said cut-outs 9, 10 of the skin layers 7, 8 and the flange layer 6 along the different sides of the essentially triangular cross section of the composite gusset filler 5 are effected by gluing and along the entire length of the composite gusset filler 5.

The skin layers 7, 8 are further arranged in a way that they intersect each other along their respective cut sides with their non bent cut-outs 9 to form a smooth plain, said plain being attached to the base skin 13 of the composite gusset filler 5.

The skin-stiffener transition assembly 1 with the composite gusset filler 5 integrated between said skin 4 and said two L-shaped fiber-reinforced fabric preforms 2, 3 may be pre-compacted in a mould or may be mounted to a component for further processing.

REFERENCE LIST 1 skin-stiffener transition
2 L-shaped textile CFRP ply
3 L-shaped textile CFRP ply
4 skin
5 composite gusset filler
6 flange layer
7 right hand fiber-reinforced skin layer
8 left hand fiber-reinforced skin layer
9 cut out
10 bent cut out
11 concave side
12 concave side
13 skin-base
14 fiber
15 corner
16 press form

What is claimed is:

1. A skin-stiffener transition assembly with a skin and two fiber-reinforced fabric preforms for a flange and a composite gusset filler integrated between said skin and said two fiber-reinforced fabric preforms, said composite gusset filler being preformed to an essentially polygonal cross section, characterized in that the skin comprises two separate skin layers and the flange comprises a flange layer, each of said skin layers and said flange layer being provided with cut outs along one side, at least one of said cut outs being bent relative to at least one adjacent cut out, and said skin layers and the flange layer being attached to the composite gusset filler with at least one of their cut-outs to one side of the essentially polygonal cross section of the composite gusset filler and with at least one of their adjacent cut-outs to another side of the essentially polygonal cross section of the composite gusset filler.

2. The skin-stiffener transition assembly according to claim 1, wherein the bent cut-outs are bent with an angle <90° relative to their respective plains of said skin layers or said flange layer.

3. The skin-stiffener transition assembly according to claim 1, wherein the essentially polygonal cross section of the composite gusset filler is triangular or trapezoidal.

4. The skin-stiffener transition assembly according to claim 3, wherein the composite gusset filler is cut with a trapezoidal cross section from a prepreg or pressed compound plate.

5. The skin-stiffener transition assembly according to claim 1, wherein the composite gusset filler is rolled from tapes or tissues and subsequently shaped.

6. The skin-stiffener transition assembly according to claim 1, wherein the depth of the cut outs are adapted to the dimensions of the cross section of the composite gusset filler.

7. The skin-stiffener transition assembly according to claim 1, wherein the lengths b of the cut outs at a side of said skin layers and said flange layer are adapted for intersection of said skin layers and said flange layer.

8. The skin-stiffener transition assembly according to claim 1, wherein the cuts are not rectangular to the side of said skin layers and said flange layer.

9. The skin-stiffener transition assembly according to claim 1, wherein the cut outs have a depth allowing a fiber to pass at an angle of 45° straight from a corner at the side into the skin layers or said flange layer.

10. An aerospace component comprising one of a helicopter airframe, helicopter structural part, airplane door, an airplane frame and a non-aerospace applications with the skin-stiffener transition assembly according to claim 1 incorporated therein.

11. A method of manufacture of said skin-stiffener transition assembly according to claim 1, comprising the steps of:
(a) providing a skin comprising skin layers and a flange comprising a flange layer;
(b) cutting along one side of each of said skin layers and said flange layer;
(c) bending open a part or all of the cut-outs along the one cut side of each of said skin layers and said flange layer;
(d) providing a semi-finished composite gusset filler; and
(e) attaching said cut outs along the cut sides to the composite gusset filler with the bent open cut-outs to at least one side of the essentially polygonal cross section of the composite gusset filler and with the remaining cut-outs to another side of the essentially polygonal cross section of the composite gusset filler.

12. The method according to claim 11, characterized by providing the semi-finished composite gusset filler by ultrasonic cutting from a precompacted or pressed preform.

13. The method according to claim 11, characterized by providing the semi-finished composite gusset filler by braiding and by subsequently pressing to a round, trapezoidal or triangular shape.

14. The method according to claim 11, characterized by gluing said cut outs along the cut sides to the composite gusset filler.

15. A skin-stiffener transition assembly with a skin, a fiber-reinforced fabric flange, and a composite gusset filler integrated between the skin and the flange, the composite gusset filler having an essentially polygonal cross section, the skin comprising two separate skin layers and the flange comprising a flange layer, each of the skin layers and the flange layer being provided with cut outs along one side, at least one of the cut outs being bent relative to at least one adjacent cut out, and the skin layers and the flange layer being attached to the composite gusset filler with at least one of their cut-outs to one side of the essentially polygonal cross section of the composite gusset filler and with at least one of their adjacent cut-outs to another side of the essentially polygonal cross section of the composite gusset filler.

16. The skin-stiffener transition assembly according to claim 15, wherein the bent cut-outs are bent with an angle <90° relative to their respective plains of the skin layers or the flange layer.

17. The skin-stiffener transition assembly according to claim 15, wherein the depth of the cut outs are adapted to the dimensions of the cross section of the composite gusset filler.

18. The skin-stiffener transition assembly according to claim 15, wherein the lengths of the cut outs at a side of the skin layers and the flange layer are adapted for intersection of the skin layers and the flange layer.

19. The skin-stiffener transition assembly according to claim 15, wherein the cuts are not rectangular to the side of the skin layers and the flange layer.

20. The skin-stiffener transition assembly according to claim 15, wherein the cut outs have a depth allowing a fiber to pass at an angle of 45° straight from a corner at the side into the skin layers or the flange layer.

* * * * *